(12) United States Patent
Motz et al.

(10) Patent No.: US 6,236,924 B1
(45) Date of Patent: May 22, 2001

(54) SYSTEM AND METHOD FOR PLANNING THE OPERATIONS OF AN AGRICULTURAL MACHINE IN A FIELD

(75) Inventors: Darin S. Motz, Pekin; Michael D. Staub, Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/337,162

(22) Filed: Jun. 21, 1999

(51) Int. Cl.$^7$ .............................. G06F 7/00; G06F 17/00; G06F 19/00
(52) U.S. Cl. .......................... 701/50; 701/214; 701/215; 172/4.5; 340/988; 340/995; 345/113; 342/359
(58) Field of Search ............................ 701/50, 214, 215; 172/4.5; 340/988, 995; 345/113; 342/359

(56) References Cited

U.S. PATENT DOCUMENTS

| | | |
|---|---|---|
| 5,050,771 | 9/1991 | Hanson et al. ............................ 222/1 |
| 5,260,875 | 11/1993 | Tofte et al. ...................... 364/424.07 |
| 5,355,815 | 10/1994 | Monson ................................ 111/200 |
| 5,438,817 | 8/1995 | Nakamura ......................... 56/10.2 A |
| 5,453,924 | 9/1995 | Monson et al. ....................... 364/131 |
| 5,646,846 | 7/1997 | Bruce et al. .................... 364/424.07 |
| 5,648,901 | 7/1997 | Gudat et al. .................... 364/424.02 |
| 5,651,500 | 7/1997 | Patterson et al. ....................... 239/69 |
| 5,684,476 * | 11/1997 | Anderson ............................. 340/988 |
| 5,689,418 | 11/1997 | Monson ................................ 364/420 |
| 5,712,782 | 1/1998 | Wiegelt et al. ................. 364/424.07 |
| 5,735,352 | 4/1998 | Henderson et al. ................... 172/4.5 |
| 5,784,540 | 7/1998 | Faltings ................................... 395/51 |
| 5,928,309 * | 7/1999 | Koever et al. ........................ 701/214 |
| 6,044,316 * | 3/2000 | Mullins .................................. 701/50 |
| 6,052,647 * | 4/2000 | Parkinson et al. .................... 701/215 |
| 6,085,135 * | 7/2000 | Steckel ................................... 701/50 |
| 6,088,644 * | 7/2000 | Brandt et al. ........................... 701/50 |

OTHER PUBLICATIONS

AgGPS 132 Paralledl Swathing Option—http://www.t-rimble.com/products/specs/sheets/pp11.htn.
Article Robotics in the Field—IVT International '97 Off–Highway 1997.
Carrier—Phase DGPS for Closed–Loop Conrol of Farm and Construction Vehicles—Navigaion: Journal of The Institute of Navigation V 43 N 2.
Patent Application No. 9/116,618 filed Jul. 16, 1998 Computer–Aided Farming System and Method.
Patent Application No. 9/277,082 filed Mar. 26, 1999 Method and Apparatus for Providing Autoguidance for Multiple Agricultural Machines.
Patent Application No. 9/280,198 filed Mar. 29, 1999 Autoguidance System and Method for an Agricultural Machine.
Research Article—Automating Agricultural Vehicles—Industrial Robot—vol. 24—No. 5—1997 pp. 364–369.

\* cited by examiner

Primary Examiner—William A. Cuchlinski, Jr.
Assistant Examiner—Ronnie Mancho
(74) Attorney, Agent, or Firm—Marla L. Hudson; Steve D. Lundquist

(57) ABSTRACT

The system includes a path planning system adapted to store a site model of the field. The site model includes data defining a plurality of parameters associated with the field. The path planning system is further adapted to receive information indicative of a work implement connected to the agricultural machine, and a desired work operation of the agricultural machine. A plurality of desired paths for the agricultural machine to traverse are planned as a function of the plurality of field parameters, the work implement, and the desired work operation. An autoguidance control system is adapted to receive the plurality of desired paths, and responsively produce a control signal upon activation of the autoguidance control system. A machine control system receives the control signal, and responsively controls the operation of the agricultural machine with respect to the plurality of desired paths.

36 Claims, 5 Drawing Sheets

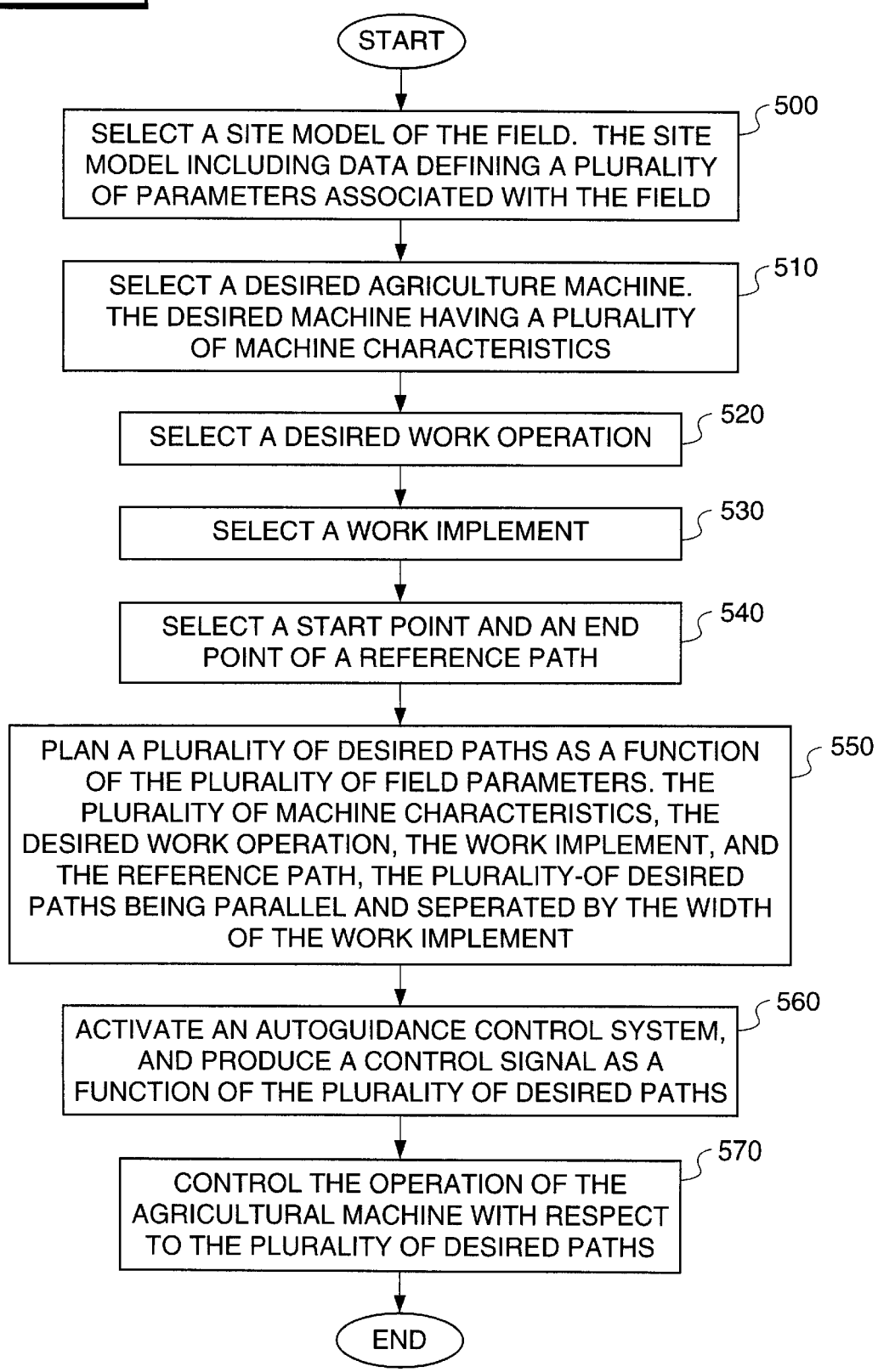

SYSTEM AND METHOD FOR PLANNING THE OPERATIONS OF AN AGRICULTURAL MACHINE IN A FIELD

TECHNICAL FIELD

This invention relates generally to a system and method for providing autoguidance for an agricultural machine and, more particularly, to a system and method for planning the operations of an agricultural machine in a field.

BACKGROUND ART

Agricultural operations, such as harvesting, plowing, planting, fertilizing, and the like, often require long, tedious hours in the field. Currently, there has been an effort to increase the efficiency and productivity of these agricultural operations.

Modern technologies, such as Global Positioning Systems (GPS), guidance systems, and machine control systems have assisted in new developments that aim to automate some or all functions of an agricultural operation, thus increasing productivity and decreasing operator fatigue. In order to automate machine functions, preliminary tasks, such as path planning, must be completed.

The present invention is directed to overcoming one or more of the problems as set forth above.

DISCLOSURE OF THE INVENTION

In one aspect of the present invention, a system for planning the operations of an agricultural machine in a field is provided. The system includes a path planning system adapted to store a site model of the field. The site model includes data defining a plurality of parameters associated with the field. The path planning system is further adapted to receive information indicative of a work implement connected to the agricultural machine, and a desired work operation of the agricultural machine. A plurality of desired paths for the agricultural machine to traverse are planned as a function of the plurality of field parameters, the work implement, and the desired work operation. An autoguidance control system is further provided, and is adapted to receive the plurality of desired paths, and responsively produce a control signal upon activation of the autoguidance control system. A machine control system receives the control signal, and responsively controls the operation of the agricultural machine with respect to the plurality of desired paths.

In another aspect of the present invention, a method for planning the operations of an agricultural machine in a field is provided. The method includes the step of storing a site model of the field. The site model includes data defining a plurality of parameters associated with the field. The method further includes the steps of receiving information indicative of a work implement connected to the agricultural machine, and a desired work operation. A plurality of desired paths for the agricultural machine to traverse are planned as a function of the plurality of field parameters, the desired work operation, and the work implement. An autoguidance control system is provided, and upon activation, is adapted to produce a control signal as a function of the plurality of desired paths. The operation of the agricultural machine is then controlled with respect to the plurality of desired paths.

BRIEF DESCRIPTION OF THE DRAWINGS

FIG. 5 is a flow diagram illustrating a preferred embodiment of the present invention.

BEST MODE FOR CARRYING OUT THE INVENTION

With reference to FIGS. 1–5, the present invention provides a system 200 and method for planning the operations of an agricultural machine 102 in an agricultural field 108.

Figure 1:
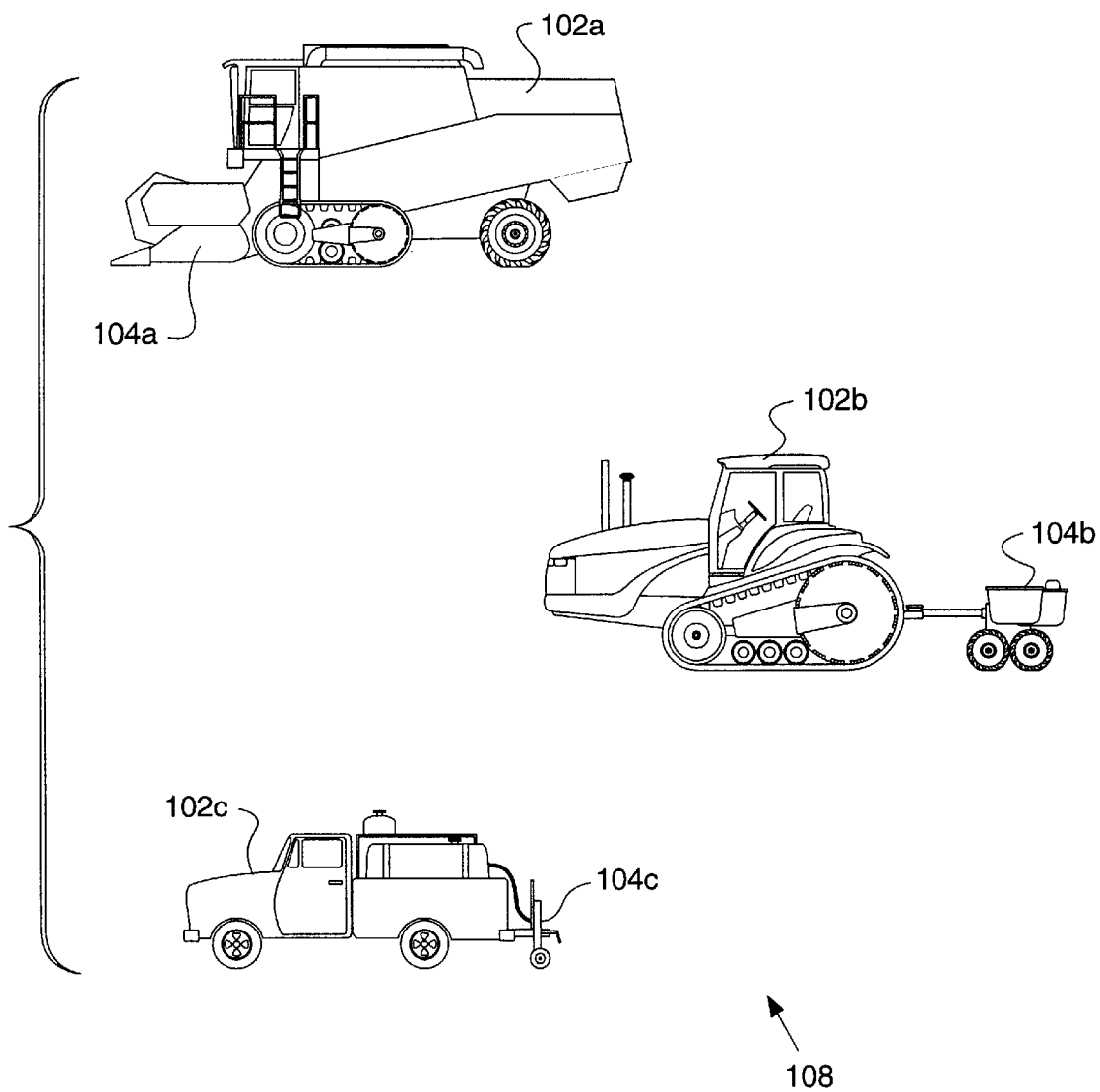
FIG. 1 is a diagrammatic illustration of a plurality of agricultural machines suitable for use with the present invention.

With reference to FIG. 1, at least one agricultural machine 102 is shown located in the field 108. As shown, the agricultural machine 102 may be a harvester 102a, a tractor 102b, a truck 102c, or any other type of mobile machine used in agricultural applications such as harvesting, planting, fertilizing, and the like. A work implement 104 is shown connected to the agricultural machine 102 in FIG. 1. As shown, the work implement 104 may be connected to the front or rear end of the agricultural machine 102 in order to perform some work function. As an example, the harvester 102a may include a thresher or header 104a, the tractor 102b may include a plow, disk harrow, seeder or planter 104b, and the truck 102c may include a chemical sprayer or granular applicator 104c.

Figure 2:
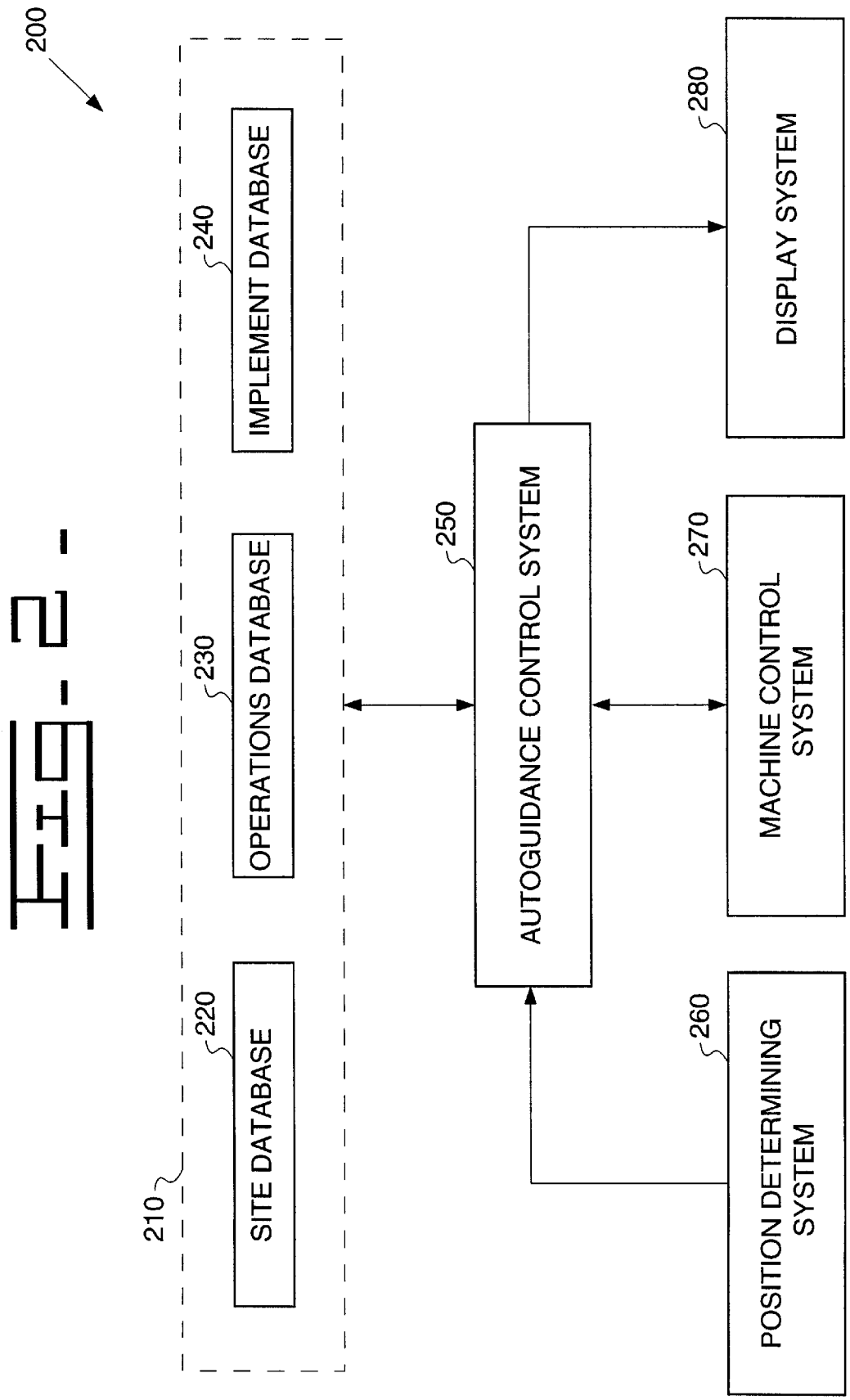
FIG. 2 is a block diagram illustrating an embodiment of the present invention.
Figure 3:
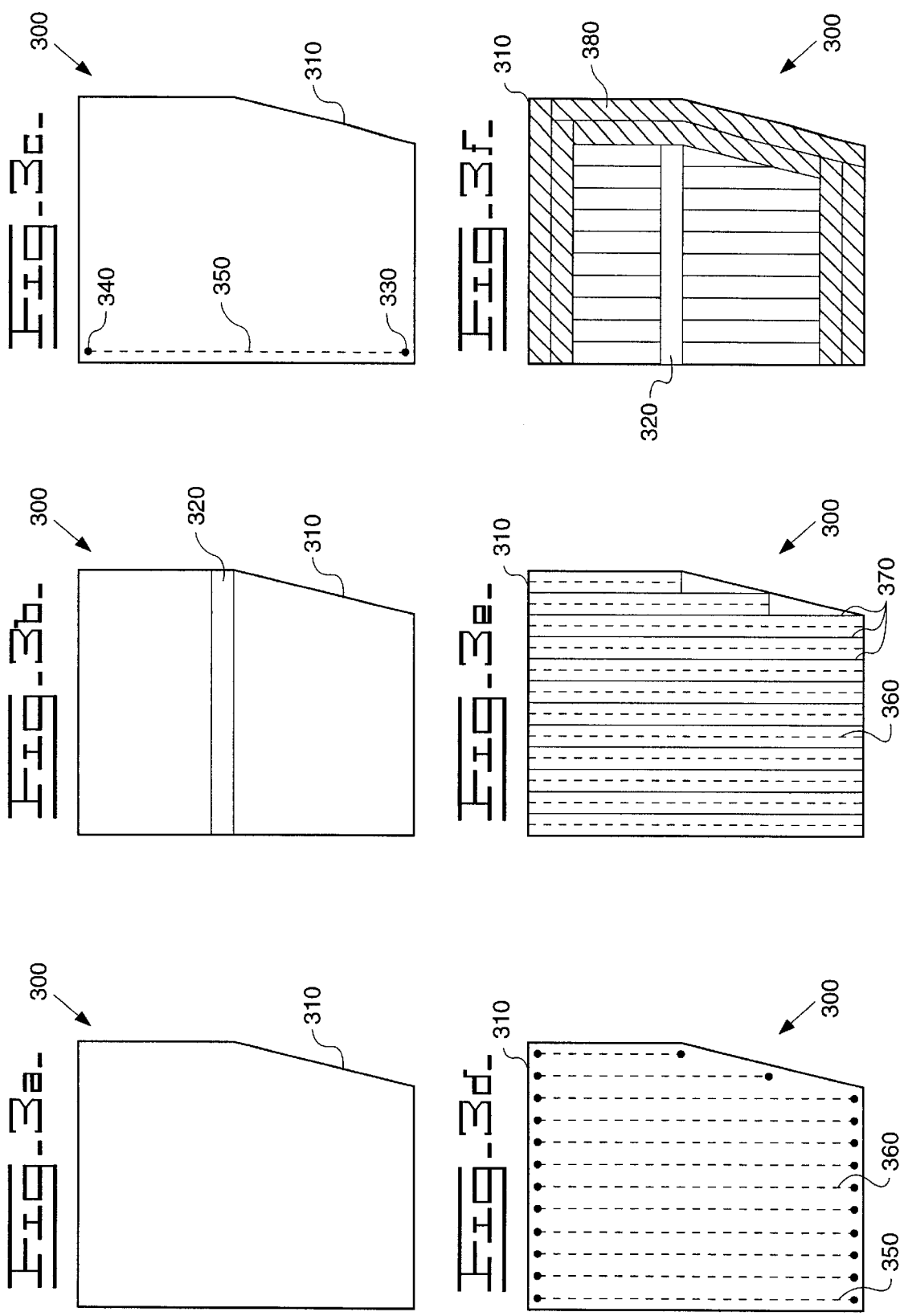
FIG. 3a is diagrammatic illustration of a site model utilized in the present invention.
FIG. 3b is a diagrammatic illustration of the site model including an area of non-tillable terrain.
FIG. 3c is a diagrammatic illustration of a reference path as determined by the present invention.
FIG. 3d is a diagrammatic illustration of a plurality of desired paths as determined by the present invention.
FIG. 3e is a diagrammatic illustration of the plurality of desired paths enclosed in polygons as determined by the present invention.
FIG. 3f is a diagrammatic illustration of the headlands of the field enclosed in polygons as determined by the present invention.

Referring now to FIG. 2, a block diagram of an embodiment of the present invention is shown.

A path planning system 210 is adapted to plan a plurality of desired paths 360 for the agricultural machine 102 to traverse. The path planning system 210 includes a site database 220, an operations database 230, and an implement database 240.

The site database 220 is adapted to store a site model 300 of the field 108. The site model 300 includes data defining a plurality of parameters associated with the field 108. Examples of parameters associated with the field 108 include yield data indicative of historical crop yields at locations throughout the field 108, moisture or rainfall levels at the field 108, soil content at various locations of the field 108, and prescription data indicative of the locations and levels of chemicals that have been applied throughout the field 108.

Parameters associated with the field 108 further include geographic information representing the topography of the field 108, e.g., obstacles within the field 108 such as rocks or trees, areas of non-tillable terrain 320 in the field 108, a boundary 310 of the field 108, slopes, contour, and the like.

The parameters associated with the field 108 may be determined and stored in the site database 220 through various methods. As an example, the field parameters may be obtained from predetermined maps provided by agricultural mapping and analysis services, from sensors located at the field 108, and from sensors located on the agricultural machine 102. Data from the sensors may be collected and stored as the agricultural machine 102 traverses and performs work operations on the field 108. The data collected during passes through the field 108 may be used to update the site model 300, and may further be stored for trending purposes.

In the preferred embodiment, the site database 220 is adapted to store a site model 300 associated with a particular field 108. However, the site database 220 may also store a plurality of site models 300 associated with a plurality of fields 108. Each of the site models 300 includes data defining a plurality of parameters associated with an individual field 108.

The operations database 230 is adapted to store operation data associated with a plurality of work operations. Work operations include harvesting, tilling, spraying, granular broadcasting, planting, drilling, and the like. Examples of operation data associated with the work operations include an elevation of the work implement 104, a desired speed of the agricultural machine 102, and a rate of application of agricultural material such as chemicals, fertilizers, and seed inputs. In the preferred embodiment, the operation data associated with the plurality of work operations is specific to each location within the field 108, and based on the parameters associated with specific locations of the field 108, as discussed above. For example, during a spraying operation, one location on the field 108 may require an application rate of chemicals that is different from the application rate required at another location on the field 108. This may perhaps be due to the different level of chemicals that have been previously applied at the different locations.

The implement database 240 is adapted to store implement data associated with a plurality of work implements 104. The plurality of work implements 104 includes plows, threshers, seeders, sprayers, discs, and the like. Examples of implement data stored for each work implement 104 include, but are not limited to, the type of work performed by the work implement 104, the width of the work implement 104, the length of the work implement 104, and the type of attachment used to connect the work implement 104 to the agricultural machine 102, e.g., a drawbar or three-point hitch.

The path planning system 210 is adapted to receive information from an operator-controlled device, such as a keyboard, mouse, touch-sensitive display screen ("touch-screen"), or similar input device.

More specifically, the path planning system 210 is adapted to receive information indicative of a desired work operation to be performed by the agricultural machine 102, and information indicative of a work implement 104 connected to the agricultural machine 102. The path planning system 210 is further adapted to receive information indicative of a start point 330 and an end point 340 of a reference path 350.

The reference path 350 may be determined by selecting the start point 330 and end point 340 via the operator-controlled input device. Alternately, the reference path 350 may be determined by traversing a path with an agricultural machine 102 equipped with position sensing means, and storing the position coordinates of the start point 330 and end point 340 of the path. It is to be noted that by selecting the start point 330 and the end point 340 of the reference path 350, the direction of travel or heading of the agricultural machine 102 is also determined.

Other types of information may be received by the path planning system 210 without departing from the spirit of the invention. For example, the path planning system 210 may receive information indicative of a desired agricultural machine 102, e.g, a harvester 102*a*, tractor 102*b*, or truck 102*c*. The desired agricultural machine 102 includes a plurality of predefined machine characteristics, e.g., physical dimensions of the machine 102, whether the machine 102 is a tracked machine or a wheeled machine, and the like.

The path planning system 210 is adapted to plan a plurality of desired paths 360 for the agricultural machine 102 to traverse as a function of the plurality of field parameters, the desired work operation, the work implement 104, the plurality of machine characteristics, and the reference path 350. Preferably, the plurality of desired paths 360 are parallel and separated by the width of the work implement 104, known as the swath. The number of desired paths 360 is dependent upon the geographic limitations, or boundary 310 of the field 108. In addition, the plurality of desired paths 360 may be straight or curved paths 360, depending upon the characteristics of the field 108.

The path planning system 210 is further adapted for determining a plurality of nodes 400 associated with the plurality of desired paths 360. Each of the plurality of nodes 400 includes a control condition. The control condition at each node 400 is a function of the plurality of parameters associated with the field 108.

An autoguidance control system 250, located on the agricultural machine 102, is adapted to communicate with the path planning system 210. Preferably, the autoguidance control system 250 is micro-processor based, and includes both read-only and random-access memory. The autoguidance control system 250 receives the plurality of desired paths 360, and responsively produces a control signal indicative of an action to be performed by the agricultural machine 102 at each node 400. The actions to be performed by the agricultural machine 102 at each of the plurality of nodes 400 is dependent upon the control condition at each node 400.

In the preferred embodiment, the path planning system 210 is located remote from the agricultural machine 102, such as at a central site office. Prior to initiating field operations, the plurality of desired paths 360 are planned by the path planning system 210, and stored in the memory of the autoguidance control system 250.

The path planning system 210 and the autoguidance control system 250 may communicate through the use of removable storage mediums, e.g., diskettes, flash cards, CD-roms, and the like. Alternately, the path planning system 210 may be located on the agricultural machine 102, and adapted to communicate with the autoguidance control system 250 through a hard-wired electrical connection.

Still further, the path planning system 210 and the autoguidance control system 250 may be adapted to communicate through a wireless communication link. In this manner, each of the plurality of desired paths 360 may be communicated to the autoguidance control system 250 one-by-one on a real-time basis.

The cooperation of the path planning system 210 and the autoguidance control system 250 in relation to planning the plurality of desired paths 360, and controlling the operation of the agricultural machine 102 with respect to the plurality of desired paths 360, will be discussed in more detail below.

A position determining system 260 located on the agricultural machine 102 is adapted to provide position data to the autoguidance control system 250. The position data includes the instantaneous position of the agricultural machine 102 in two-dimensional or three-dimensional space, as well as the heading and speed of the agricultural machine 102 as the machine 102 traverses the field 108. Preferably, the position determining system 260 includes a GPS receiver. However, other means for determining position data such as radar, laser, dead reckoning, or any combination of position determining means could be used without deviating from the invention.

The autoguidance control system 250 is also in communication with a machine control system 270, located on the agricultural machine 102. Upon activation, the autoguidance control system 250 determines an action to be performed by the agricultural machine 102 based on the position data and the planned paths 360, and responsively produces and delivers a control signal. The machine control system 270 receives the control signal, and responsively controls the operation of the agricultural machine 102.

In the preferred embodiment, the machine control system 270 is adapted to control the steering or navigation of the agricultural machine with respect to the plurality of desired paths 360. In addition, the machine control system 270 is adapted to control the work implement 104 in order to perform the desired work operation.

Preferably, the machine control system 270 is an electro-hydraulic system which operates, for example, steering, brake, throttle, work implement, and motor controls, as is well known in the art.

The machine control system 270 may further be adapted to communicate the actions taken by the agricultural machine 102 and the work implement 104, as the agricultural machine 102 traverses the field 108, to the autoguidance control system 250. This information may then be used to update the site model 300 of the field 108.

A display system 280, located on the agricultural machine 102, receives information from the autoguidance control system 250, and responsively displays the position and heading of the agricultural machine 102 with respect to the plurality of desired paths 360. The display system 280 may also display other types of information, such as the speed of the agricultural machine 102, the transmission gear being used, and the like.

FIGS. 3a–3f are diagrammatic illustrations of the site model 300 utilized in the present invention. Referring to FIG. 3a, a site model 300 of the field 108 is shown as an area with an irregularly shaped perimeter or boundary 310.

As shown in FIG. 3b, the site model 300 includes a plurality of parameters associated with the field 108, such as an area of non-tillable terrain 320, e.g, a waterway that can be traversed by the agricultural machine 102 but should not be tilled.

FIG. 3c illustrates the start point 330, the end point 340, and the resultant reference path 350. The reference path 350 is determined by connecting the start point 330 and the end point 340.

The plurality of desired paths 360 for the agricultural machine 102 to traverse, as planned by the path planning system 210, is illustrated in FIG. 3d. As shown, the desired paths 360 are parallel with respect to each other and to the reference path 350. However, it is to be understood that adjacent, non-parallel paths may also be determined without departing from the spirit of the invention. In addition, it is to be understood that the planned paths 360 do not have to be traversed in the order in which they are arranged, i.e., on a subsequent pass, the agricultural machine 102 need not traverse the path 360 immediately adjacent the previously traversed path 360.

In the preferred embodiment, the plurality of desired paths 360 are enclosed in polygons 370, as illustrated in FIG. 3e. The polygons 370 include at least two parallel sides separated by the width of the work implement 104. As shown in FIG. 3e, the desired path 360 for the agricultural machine to traverse is located in the center of the polygon 370, and shown as a dotted line.

The autoguidance control system 250 continuously receives position data from the position determining system 260 as the agricultural machine 102 traverses the field 108, and responsively determines a current position of the agricultural machine 102. The autoguidance control system 250 then determines the polygon containing the current position, and retrieves the corresponding desired path 360 enclosed by that polygon. As the agricultural machine 102 traverses the field 108, the autoguidance control system 250 compares each new position with the previous position of the agricultural machine 102. If the polygons containing the previous and current positions are different, the autoguidance control system 250 retrieves the desired path 360 enclosed by the polygon containing the current position, and responsively produces the control signal. Thus, by enclosing the plurality of desired paths 360 in polygons, the autoguidance control system 250 is able to determine the desired path 360 closest to the current position of the agricultural machine 102 in the field 108.

With reference to FIG. 3f, the field 108 is surrounded by headlands at the top, bottom, and side. The headlands represent the area in which the agricultural machine 102 will turn, or change the direction of travel, in order to traverse another path 360. As shown in FIG. 3f, the headlands are also enclosed in polygons 380, and shown with diagonal lines.

The plurality of nodes 400, as discussed above, are determined by the path planning system 210. Additionally, the path planning system 210 determines a control condition associated with each node 400, the control condition being a function of the field parameters stored in the site database 220.

The autoguidance control system 250 determines an action to be performed by the agricultural machine 102 at each node 400, as a function of the control condition at each node 400. For example, the autoguidance control system 250 may produce a control signal instructing the agricultural machine 102 to raise or lower the work implement 104, open or close a valve, steer the agricultural machine 102 to the right or left, and the like.

Figure 4:
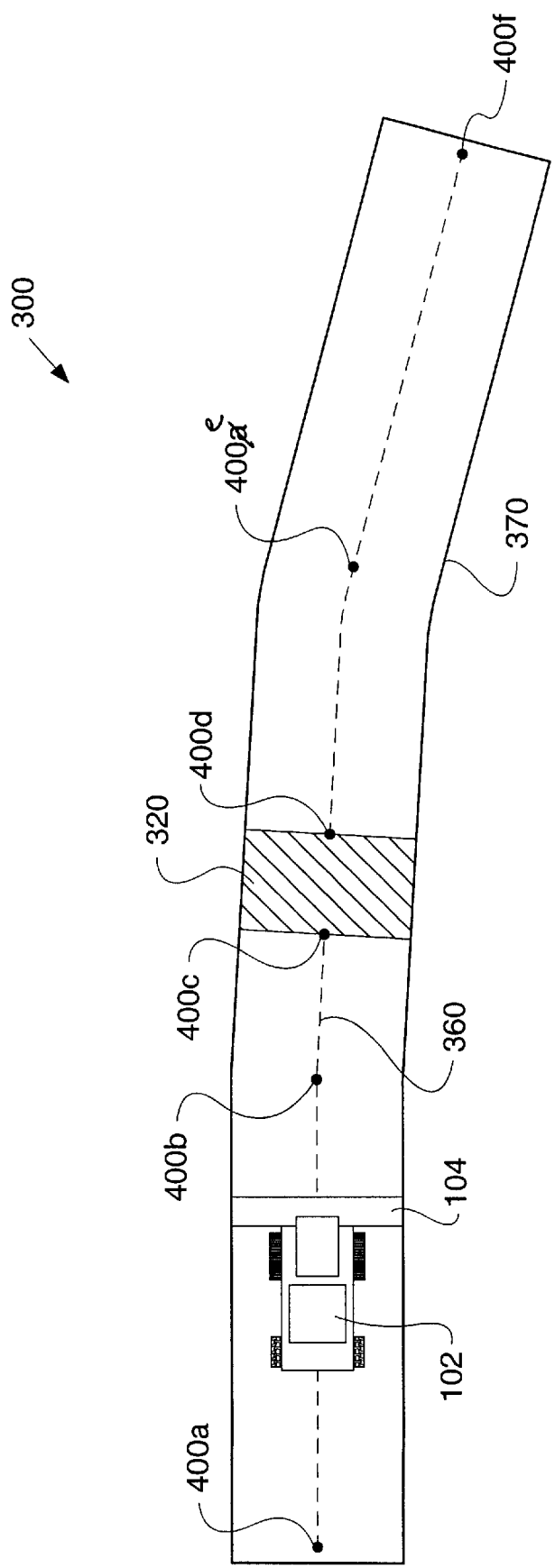
FIG. 4 is a diagrammatic illustration of the desired path including a plurality of nodes as determined by the present invention.

With reference to FIG. 4, nodes 400a–f are shown located at specified locations along the desired path 360. Each of the nodes 400a–f includes a control condition, such as do not plant or plow, vary the rate of an application, alter the depth of till, change the speed of the agricultural machine 102, and the like.

In the example of FIG. 4, the control condition at nodes 400a,b,e,f contains information indicative of the desired work operation to be performed by the work implement 104, such as plant, plow, or spray, as discussed above. Based on the control condition at each of the nodes 400a,b,e,f, and upon activation, the autoguidance control system 250 determines an action to be performed by the agricultural machine 102, and responsively delivers a control signal to the machine control system 270. The machine control system 270 may then, as an example, activate actuators in order to apply chemicals or seeds at a specified rate.

The control condition at nodes 400a,f may indicate the start and end of the path 360, respectively, and the agricultural machine 102 controlled accordingly. For example, upon activation, the autoguidance control system 250 may instruct the agricultural machine 102 to start traversing the path 360 in response to the control condition at node 400a, and to stop movement in response to the control condition at node 400f. Alternatively, the control condition at nodes 400a,f may represent a desired change in heading of the agricultural machine 102.

As illustrated in FIG. 4, node 400c represents one side of an area of non-tillable terrain 320, and node 400d represents another side of the area of non-tillable terrain 320. In this example, the control condition associated with node 400d may indicate a desired action, such as do not plow, and the control condition associated with 400d may indicate that the plowing operation is to be resumed.

With reference to FIG. 5, a flow diagram is shown illustrating the operation of a preferred embodiment of the present invention.

In a first control block 500, an operator selects a site model 300 of the field 108 to be traversed by the agricultural machine 102, via an input device of the path planning system 210, e.g., a keyboard or touch-screen. The site model 300 may be selected from a plurality of site models 300 stored in a site database 220. Each of the site models 300 includes data defining a plurality of parameters associated with an individual one of a plurality of fields 108.

In a second control block 510, the operator selects a desired agricultural machine 102, the desired agricultural machine 102 having a plurality of machine characteristics, e.g., physical dimensions of the machine 102.

Control then proceeds to a third control block 520 and a fourth control block 530. In the third control block 520, the operator selects a desired work operation, e.g., harvesting, tilling, spraying, planting, and the like. In the fourth control block 530, the operator selects a work implement 104 for performing the desired work operation.

In a fifth control block 540, the operator selects a start point 330 and an end point 340 of a reference path 350. The reference path 350 may be straight or curved depending upon the characteristics of the field 108. In a sixth control block 550, the path planning system 210 plans a plurality of desired paths 360 for the agricultural machine 102 to traverse as a function of the field parameters, the plurality of machine characteristics, the desired work operation, the work implement 104, and the reference path 350. Preferably, the plurality of desired paths 360 are parallel with respect to each other and to the reference path 350.

Control then proceeds to a seventh control block 560 and an eighth control block 570. In the seventh control block 560, the autoguidance control system 250 is activated, preferably via an operator-controlled switch. Upon activation, the autoguidance control system 250 determines an action to be performed by the agricultural machine 102, and responsively produces and delivers a control signal to the machine control system 270. In the eighth control block 570, the machine control system 270 controls the operation of the agricultural machine 102 with respect to the plurality of desired paths 360.

Although the invention is described above with reference to only one agricultural machine 102 operating in the field 108, it is to be understood that the present invention is equally suitable for use with a plurality of agricultural machines 102. All of the agricultural machines 102 may perform the same or different work operations on different portions of the field 108.

INDUSTRIAL APPLICABILITY

As an example of an application of the present invention, and with reference to FIG. 1, agricultural machines 102 utilize a plurality of work implements 104 to perform various work operations on an agricultural field 108. For example, during a harvesting operation, a harvester 102a may utilize a header or thresher 104a to cut and thresh the crop. During a planting operation, a tractor 102b may be used to pull a planter 104b to plant seeds at a specified rate, and during a spraying operation, a truck 102c may utilize a sprayer 104c to spray fertilizer. In each of these examples, the agricultural machine 102 used, the type of work implement 104 connected to the agricultural machine 102, and the desired work operation to be performed, may vary for different agricultural fields 108, or over different portions of the same field 108.

The present invention provides a system 200 for planning the operations of an agricultural machine 102 on an agricultural field 108. Prior to initiating field operations, an operator selects various parameters associated with the field operation, such as a site model 300 of the field 108, the type of machine 102 and work implement 104 to be used, and the desired work operation to be performed on the field 108. A path planning system 210 receives this information, and responsively plans a plurality of desired paths 360 for the agricultural machine 102 to traverse. Each of the plurality of desired paths 360 includes a node 400 having a corresponding control condition.

The plurality of desired paths 360 are transferred from the path planning system 210, and stored in the memory of an autoguidance control system 250 located on the agricultural machine 102. As the agricultural machine 102 traverses the field 108 with respect to the plurality of desired paths 360, the autoguidance control system 250, when activated, determines an action to be performed by the agricultural machine 102 at each of the plurality of nodes 400 based on the control condition, and responsively delivers a control signal to a machine control system 270. The machine control system 270 controls the operation of the machine 102 and work implement 104 in order to perform the action determined by the autoguidance control system 250.

Other aspects, objects, and features of the present invention can be obtained from a study of the drawings, the disclosure, and the appended claims.

What is claimed is:

1. A system for planning the operations of an agricultural machine in a field, comprising:

a path planning system adapted to store a site model of the field, the site model including data defining a plurality of parameters associated with the field, the path planning system being further adapted to receive information indicative of a work implement connected to the agricultural machine, and a desired work operation of the agricultural machine, and responsively plan a plurality of desired paths for the agricultural machine to traverse as a function of the plurality of field parameters, the work implement, and the desired work operation, wherein the path planning system includes an implement database adapted to store implement data associated with a plurality of work implements, the implement data stored for each of the plurality of work implements including at least one of a width of the work implement, and a length of the work implement;

an autoguidance control system located on the agricultural machine, the autoguidance control system adapted to receive signals corresponding to the plurality of desired paths, and responsively produce a control signal upon activation of the autoguidance control system; and a machine control system located on the agricultural machine and adapted to receive the control signal from the autoguidance control system, and responsively control the operation of the agricultural machine with respect to the plurality of desired paths.

2. A system, as set forth in claim 1, wherein the path planning system is located remote from the agricultural machine.

3. A system, as set forth in claim 1, wherein the path planning system is located on the agricultural machine.

4. A system, as set forth in claim 1, wherein the path planning system is adapted to receive information indicative of a desired agricultural machine, the desired agricultural machine having a plurality of machine characteristics, wherein the plurality of desired paths are planned as a function of the plurality of field parameters, the desired work operation, the work implement, and the plurality of machine characteristics.

5. A system, as set forth in claim 1, wherein the path planning system includes a site database adapted to store the site model.

6. A system, as set forth in claim 5, wherein the site database is adapted to store a plurality of site models, each of the plurality of site models including data defining a plurality of parameters associated with an individual one of a plurality of fields.

7. A system, as set forth in claim 1, wherein the plurality of field parameters includes at least one of yield data, rainfall data, prescription data, a boundary of the field, an obstacle in the field, and an area of non-tillable terrain in the field.

8. A system, as set forth in claim 1, wherein the path planning system includes an operations database, the operations database adapted to store operation data associated with a plurality of work operations.

9. A system, as set forth in claim 8, wherein the operation data includes at least one of a rate of application of the work implement, an elevation of the work implement, and a desired speed of the agricultural machine.

10. A system, as set forth in claim 1, further including a position determining system located on the agricultural machine, wherein the autoguidance control system is adapted to receive position data from the position determining system, and responsively determine a current position of the agricultural machine.

11. A system, as set forth in claim 10, wherein each of the plurality of desired paths is enclosed in a polygon having at least two parallel sides, the parallel sides being separated by the width of the work implement.

12. A system, as set forth in claim 11, wherein the autoguidance control system is adapted to determine the polygon containing the current position.

13. A system, as set forth in claim 10, wherein the position data includes position, speed, and heading of the agricultural machine.

14. A system, as set forth in claim 10, wherein the position determining system includes a GPS receiver.

15. A system, as set forth in claim 10, wherein the machine control system is adapted to control steering of the agricultural machine in response to the control signal.

16. A system, as set forth in claim 10, further including a display system located on the agricultural machine, the display system being adapted to receive information from the autoguidance control system.

17. A system, as set forth in claim 16, wherein the display system is adapted to display the position and heading of the agricultural machine with respect to the plurality of desired paths.

18. A system, as set forth in claim 1, wherein the path planning system is adapted to receive a start point and an end point of a reference path.

19. A system, as set forth in claim 18, wherein the plurality of desired paths are parallel, each of the plurality of parallel paths being planned as a function of the reference path and the width of the work implement.

20. A system, as set forth in claim 1, wherein each of the plurality of desired paths includes a plurality of nodes.

21. A system, as set forth in claim 20, wherein each of the plurality of nodes includes a control condition, wherein the autoguidance control system is adapted to determine an action to be performed by the agricultural machine at each node as a function of the control condition.

22. A method for planning the operations of an agricultural machine in a field, the method comprising the steps of:

storing a site model of the field, the site model including data defining a plurality of parameters associated with the field;

receiving information indicative of a desired work operation;

receiving information indicative of a work implement, the work implement being connected to the agricultural machine, the information including at least one of a width of the work implement and a length of the work implement;

planning a plurality of desired paths for the agricultural machine to traverse as a function of the plurality of field parameters, the desired work operation, and the work implement;

activating an autoguidance control system, and producing a control signal as a function of the plurality of desired paths; and controlling the operation of the agricultural machine with respect to the plurality of desired paths in response to the control signal.

23. A method, as set forth in claim 22, further including the step of receiving information indicative of a desired agricultural machine, the desired agricultural machine having a plurality of machine characteristics, wherein the plurality of desired paths are planned as a function of the plurality of field parameters, the desired work operation, the work implement, and the plurality of machine characteristics.

24. A method, as set forth in claim 22, wherein storing the site model of the field includes the step of storing the site model in a site database.

25. A method, as set forth in claim 22, wherein storing a site model of the field includes the step of storing a plurality of site models in a site database, each of the plurality of site models including data defining a plurality of parameters associated with an individual one of a plurality of fields.

26. A method, as set forth in claim 25, further including the step of selecting a desired field for the agricultural machine to traverse, the desired field being selected from among the plurality of fields stored in the site database.

27. A method, as set forth in claim 22, further including the step of determining position data associated with the agricultural machine.

28. A method, as set forth in claim 27, wherein determining position data includes the step of determining position, speed, and heading of the agricultural machine.

29. A method, as set forth in claim 27, wherein controlling the operation of the agricultural machine includes the step of controlling the steering of the agricultural machine.

30. A method, as set forth in claim 22, wherein controlling the operation of the agricultural machine includes the step of controlling the work implement to perform the desired work operation.

31. A method, as set forth in claim 27, further including the step of displaying the position and heading of the agricultural machine with respect to the plurality of desired paths.

32. A method, as set forth in claim 22, further including the step of selecting a start point and an end point of a reference path.

33. A method, as set forth in claim 32, wherein planning the plurality of desired paths includes the step of planning a plurality of parallel paths as a function of the reference path and the width of the work implement.

34. A method, as set forth in claim 22, wherein planning a plurality of desired paths includes the step of determining a plurality of nodes, wherein each of the plurality of nodes includes a control condition.

35. A method, as set forth in claim 34, wherein producing the control signal includes the step of determining an action to be performed by the agricultural machine at each node in response to the control condition.

36. A system for planning the operations of an agricultural machine in a field, comprising:
   a path planning system including a site database, an operations database, and an implement database, the path planning system being adapted to receive information indicative of a work implement connected to the agricultural machine, a desired work operation of the agricultural machine, a start point of a reference path, and an end point of the reference path;
   an autoguidance control system located on the agricultural machine, and in communication with the path planning system;
   a position determining system located on the agricultural machine, the position determining system adapted to provide position data to the autoguidance control system, the position data including a position, speed, and heading of the agricultural machine;
   a machine control system located on the agricultural machine, and in communication with the autoguidance control system;
   a display system located on the agricultural machine, and adapted to receive information from the autoguidance control system;
   wherein the site database is adapted to store a site model of the field, the site model including data defining a plurality of parameters associated with the field, the plurality of parameters including at least one of yield data, rainfall data, prescription data, a boundary of the field, an obstacle in the field, and an area of non-tillable terrain in the field;
   wherein the operations database is adapted to store operation data associated with a plurality of work operations, the operation data including a rate of application of the work implement, and an elevation of the work implement;
   wherein the implement database is adapted to store implement data associated with a plurality of work implements, the implement data stored for each of the plurality of work implements includes a width of the work implement, and a length of the work implement;
   wherein the path planning system is further adapted to plan a plurality of desired paths for the agricultural machine to traverse as a function of the plurality of field parameters, the work implement, the desired work operation, and the reference path;
   wherein the plurality of desired paths are parallel, each of the plurality of parallel paths being planned as a function of the reference path and the width of the work implement;
   wherein each of the plurality of desired paths are enclosed in a polygon having at least two parallel sides, the parallel sides being separated by the width of the work implement;
   wherein the plurality of desired paths include a plurality of nodes, each of the plurality of nodes including a control condition;
   wherein the autoguidance control system is adapted to receive the plurality of desired paths, and upon activation produce a control signal indicative of an action to be performed by the agricultural machine at each node;
   wherein the machine control system is adapted to receive the control signal, and responsively control the operation of the agricultural machine; and
   wherein the display system is adapted to display the position and heading of the agricultural machine with respect to the plurality of desired paths.

* * * * *